April 17, 1962     J. VOSS     3,029,788
BIRD CAGE
Filed Jan. 22, 1959     4 Sheets-Sheet 1
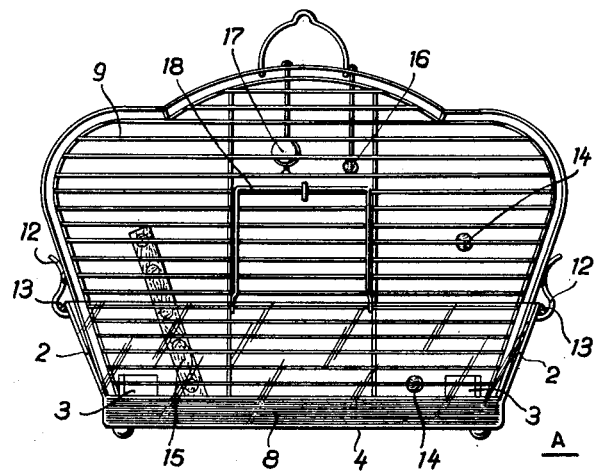
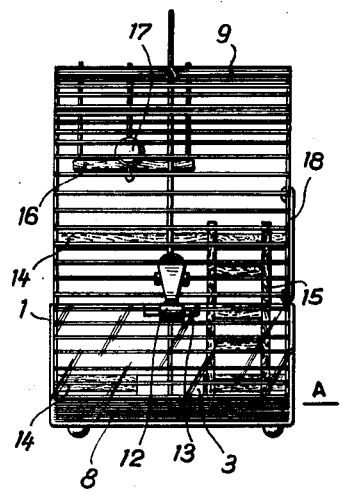
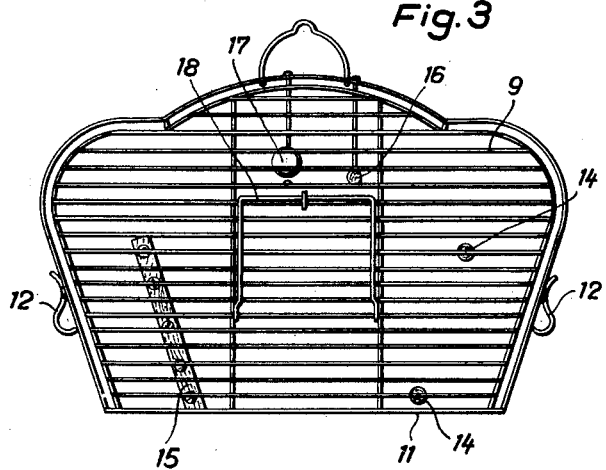
INVENTOR
Josef VOSS April 17, 1962 J. VOSS 3,029,788
BIRD CAGE
Filed Jan. 22, 1959 4 Sheets-Sheet 2
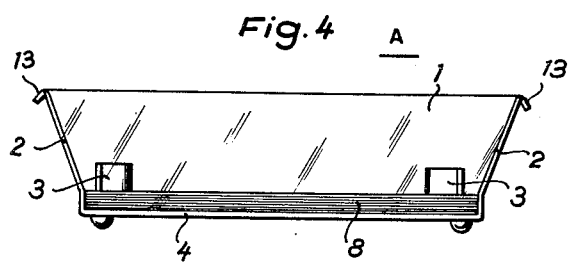
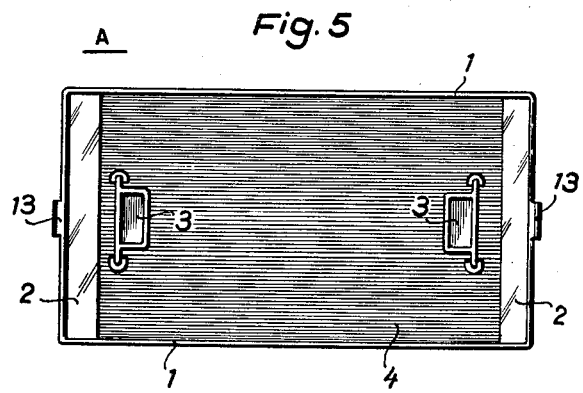
INVENTOR
Josef VOSS

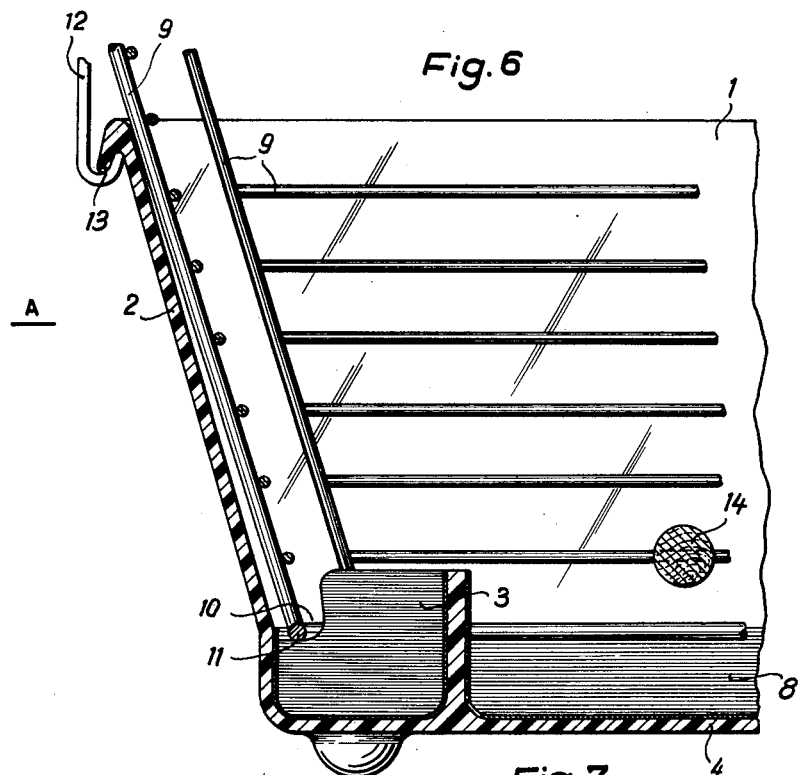
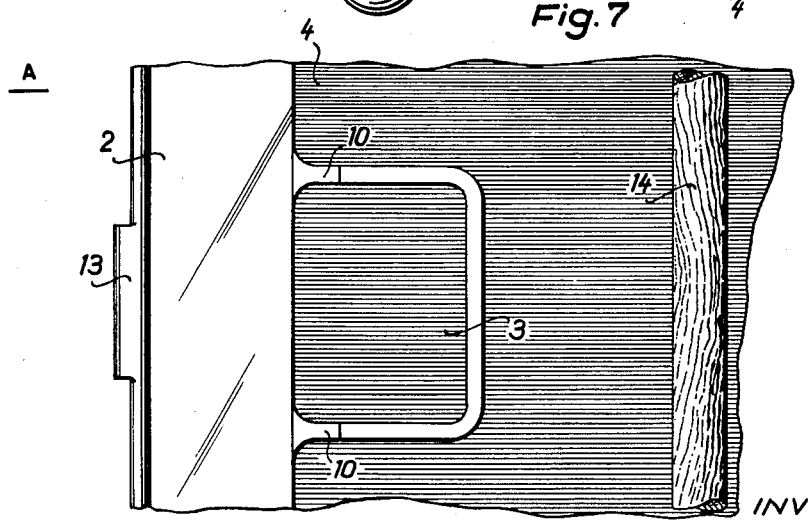

April 17, 1962 J. VOSS 3,029,788
BIRD CAGE

Filed Jan. 22, 1959 4 Sheets-Sheet 4

INVENTOR
Josef VOSS

United States Patent Office 3,029,788
Patented Apr. 17, 1962

3,029,788
BIRD CAGE
Josef Voss, Norbertus-Strasse 35, Neheim-
Husten, Germany
Filed Jan. 22, 1959, Ser. No. 788,319
Claims priority, application Germany Feb. 28, 1958
6 Claims. (Cl. 119—18)

This invention has reference to bird cages.

It is one object of this invention to provide improved bird cages of utmost structural simplicity and dimensional stability, doing away with fragile glass parts present in many prior art bird cages.

Another object of the invention is to provide bird cages which comprise an effective transparent substitute for the lateral guard plates of glass heretofore frequently used on bird cages.

Still another object of the invention is to provide bird cages having lateral transparent guard plates forming integral parts of the base of the bird cage.

Another object of the invention is to provide improved bird cages which because of their structural simplicity lend themselves particularly well to maintenance and cleaning.

A further object of the invention is to provide simplified bird cages which include transparent guard means and comprise essentially but two parts.

The foregoing and other general and special objects of the invention and advantages thereof will more clearly appear from the ensuing particular description of the invention as illustrated in the accompanying drawings, wherein:

FIG. 1 is a front elevation of a fully assembled bird cage embodying the invention;

FIG. 2 is a side elevation of the bird cage shown in FIG. 1;

FIG. 3 is a front elevation of a hood structure formed of spaced wires open at the bottom thereof forming an integral part of the cage of FIGS. 1 and 2;

FIG. 4 is a side elevation of the base forming an integral part of the cage of FIGS. 1 and 2;

FIG. 5 is a top plan view of the base shown in FIG. 4;

FIG. 6 shows partly in side elevation and partly in vertical section a portion of the hood structure and a portion of the base of the cage of FIGS. 1 and 2;

FIG. 7 is a bottom plan view of the parts shown in FIG. 6;

Figure 8:
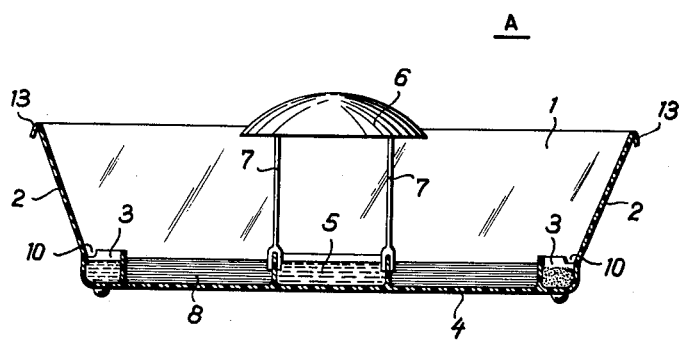
FIG. 8 is a side elevation showing the same parts as FIG. 4 in a slightly modified form.
Figure 9:
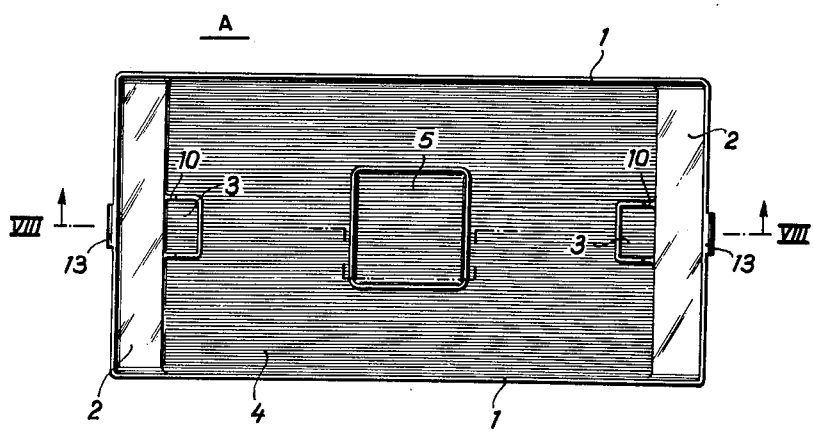
FIG. 9 is a bottom plan view of the parts shown in FIG. 8.

Referring now to the drawings, and more particularly FIGS. 1–7 thereof, reference letter A has been applied to generally indicate a base made of a transparent synthetic resin. Base A comprises the horizontal bottom plate 4 and four side plates 1, 2, all formed by one single integral molding. The two side plates 1 are arranged in parallel planes and the two side plates 2 diverge in upward direction. The four side plates 1, 2 define a cavity open at the upper side thereof. The bottom plate 4 defines a plurality of recesses forming integral parts thereof, including a recess for receiving food and a recess for receiving drinking water, to both of which reference numeral 3 has been applied, and a further recess to be used as the bird bath, generally designated by the reference numeral 5. As shown in FIG. 8 bath 5 may be covered by a roof 6 supported by pillars 7. The lower portion of base A is rendered opaque, preferably by means of one or more layers of spray-paint covering the inner surface of bottom plate 4 and the inner surfaces 8 of the lower portions of side plates 1, 2. The layer or layers of spray-paint on the inner surface of bottom plate 4 make it possible for the bird to readily walk on it. Without such a layer the surface of synthetic resin base A would be too smooth and cause the bird to slip. Opaquing of the bottom portions, or lower margins, of plates 1, 2 removes from view the unavoidable amount of dirt that always accumulates on the bottom of bird cages.

Reference numeral 9 has been applied to generally indicate a hood structure formed of spaced wires adapted to be inserted into the cavity defined by side walls 1, 2 and to rest with the lower end 11 thereof on the lower portion of base A. FIG. 3 shows hood structure 9 per se, and FIGS. 1 and 2 show hood structure 9 superimposed upon and combined with base A. Hood structure 9 is made up of two sides arranged in parallel planes, two sides arranged in converging planes and of a ceiling or apex portion.

The cage further comprises coupling means adapted for selective coupling of hood structure 9 and base A and uncoupling hood structure 9 from base A. In the particular embodiment of the invention illustrated in the drawings the hood structure 9 is provided with flexible manually operable coupling levers 12 arranged at points situated between the ceiling or apex portion of hood structure 9 and the lower end or edge 11 thereof. Coupling levers 12 are adapted to cooperatively engage projections or abutment surfaces formed adjacent to, or at, the upper ends of side plates 2 (see particularly FIG. 6). The inside of hood structure 9 is provided with bars 14 for the bird, a ladder 15, a swing 16, balls 17 and hood structure 9 is adapted to be opened and to be closed by means of door 18.

As shown in FIGS. 6 and 7 the portion of the base molding A defining recesses 3 may be provided with separate recesses 10 for receiving the lower ends or edges 11 of hood structure 9.

It is apparently easy to uncouple parts 9 and A, and thereafter part 9 may readily be lifted from part A with the bird in part 9, thus exposing part A for cleaning. There is no danger that the bird escapes from part 9 while being lifted from part A since birds escape by flying in upward direction, and do not try to escape through an open aperture in the bottom of their cage.

The cage may be provided with legs forming integral parts of the molding of which part A is formed.

Heretofore bird cages having transparent lateral splash guards could not be shipped in fully assembled condition because the cages had to be used during the shipment thereof as containers for the splash guards of glass. Since this invention does away with lateral guards of glass the cage, or the wire hood structure 9 thereof, may be shipped with parts 14, 15, 16 and 17 installed therein.

The hood structure 9 of the cage may be metal plated in any desired fashion, and the spray paint on base A may be varied to match the plating on the hood structure 9.

In order to cause the transparent lateral panels to form lateral guards effectively precluding any bird inside of the cage from ejecting matter to the outside thereof, the overlap between the hood part of the cage formed of wire bars and the panels must be substantial. In the drawings the hood part is shown to have a predetermined height and the aggregate height of the tray bottom and its lateral transparent panels is about one third of said predetermined height; it should be at least one fourth of said predetermined height. The recesses 10 form abutment surfaces against which the edges 11 of the hood part are firmly clamped, thus precluding relative wobbling of the hood part and the tray-part of the cage when the cage is lifted by means of a handle provided on the top thereof. Convenience of handling the cage is, however, greatly facilitated by virtue of the upwardly flaring configuration of the two side plates 2.

While I have shown a preferred cage whose base is rectangular the invention is not limited to cages having rectangular bases.

It will be apparent from the foregoing that the four transparent lateral panels, side plates or splash guards 1, 2 overlap the lower portion of hood structure 9, thus covering the lower portion of hood structure 9 without obstructing the view thereof. As best shown in FIG. 6 the hood structure 9, i.e. the lower edge 11 thereof, rests upon the recessed abutment surfaces 10 of bottom plate 4. The points of support 10 of hood structure 9 on base A are situated below the upper edges of lateral panels or guard plates 1, 2 and inside of the space which is laterally bounded by the panels or guard plates 1, 2. The lower edge 11 of hood structure 9 resting on surfaces 10 is situated substantially at the level of bottom plate 4. As can best be seen in FIG. 6 the clamping hooks 12 which are affixed to hood structure 9 engage groove means substantially in the shape of an inverted V formed by splash guards 2 adjacent the upper end thereof. This way of securing hood structure 9 to base A minimizes manufacturing cost.

It will be understood that I have illustrated and described herein a preferred embodiment of my invention and that various alterations may be made in the details thereof without departing from the spirit and scope of my invention as defined in the appended claims.

I claim as my invention:

1. A bird cage comprising a hood structure formed of spaced wires and being open at the bottom thereof, a molded base of a synthetic resin including a bottom plate defining first recesses adapted to receive food and water, said base further including as integral parts thereof at least partly transparent lateral guard plates, groove means substantially in the shape of an inverted V formed by said guard plates adjacent the upper edges thereof, said hood structure being superimposed upon said base and supported by said base at second recesses thereof situated inside the space bounded by said lateral guard plates and substantially at the level of said bottom plate, and releasable clamping means affixed to said hood structure engaging said groove means for clamping said hood structure against second recesses of said base.

2. A bird cage comprising a hood structure formed of spaced wires and being open at the bottom thereof; a molded base of a synthetic resin including a bottom plate defining recesses on the upper side thereof and projections on the lower side thereof on which said bottom plate rests, said base further including as integral parts thereof at least partly transparent lateral splash guards, and said bottom plate defining substantially horizontal abutment surfaces situated inside of the space bounded by said splash guards; an opaque layer of paint covering said upper side of said bottom plate; groove means substantially in the shape of an inverted V formed by said splash guards adjacent the upper edges thereof; said hood structure being superimposed upon said base and supported by said abutment surfaces of said bottom plate; and releasable clamping means affixed to said hood structure engaging said groove means for clamping said hood structure against said abutment surfaces.

3. A bird cage comprising:

(a) a hood structure having a predetermined height and being formed of spaced wires and being open at the bottom thereof;

(b) a base of transparent synthetic resin including a tray portion and four lateral panels integral with said tray portion and having upper edges at a level approximately equal to one third of said predetermined height, said base defining abutment surfaces for the lower edges of said hood structure situated substantially below said upper edges of said panels adjacent said tray portion of said base; and (c) pairs of cooperating readily releasable fasteners for securing said hood structure to said base, one of the constituent elements of each of said pairs of fasteners being integral with said hood structure and the other of the constituent elements of each of said pairs of fasteners being integral with said base, and each of said pairs of fasteners being arranged immediately adjacent said upper edges of said panels.

4. A bird cage comprising:

(a) a hood structure having a predetermined height and being formed of spaced wires and being open at the bottom thereof;

(b) readily releasable clamping means adapted to cooperatively engage abutment surfaces, said clamping means being integral with said hood structure and arranged at a level approximately equal to one third of said predetermined height; and (c) a base of transparent synthetic resin including a tray portion and four lateral panels integral with said tray portion and having upper edges at a level approximately equal to one third of said predetermined height, said base defining first abutment surfaces for the lower edges of said hood structure situated substantially below said upper edges of said panels adjacent said tray portion of said base and said base further defining second abutment surfaces situated adjacent said upper edges of said panels and cooperatively engaged by said clamping means.

5. A bird cage comprising:

(a) a hood structure having a predetermined height and formed of spaced wires and being open at the bottom thereof;

(b) a base of transparent synthetic resin including a tray portion and four lateral panels integral with said tray portion and forming a continuous non-perforated splashguard coextensive with the entire perimeter of said tray portion, said panels having upper edges at a level approximately equal to one third of said predetermined height, said base defining abutment surfaces for the lower edges of said hood structure situated substantially below said upper edges of said panels adjacent said tray portion of said base;

(c) opaque means applied to but a limited portion of said base while leaving transparent other portions thereof; and;

(d) readily releasable cooperating clamping means on the outer surface of said hood structure and on the outer surfaces of said base adapted to clamp said hood structure against said abutment surfaces of said base.

6. A bird cage as specified in claim 5 wherein said opaque means are applied to said tray portion and wherein said panels are left transparent.

References Cited in the file of this patent

UNITED STATES PATENTS

| | | |
|---|---|---|
| 2,316,263 | Little | Apr. 13, 1943 |
| 2,539,024 | Leiby | Jan. 23, 1951 |
| 2,611,338 | Yellin | Sept. 23, 1952 |
| 2,708,900 | Yellin | May 24, 1955 |
| 2,765,711 | Kevorkian | Oct. 9, 1956 |
| 2,778,333 | Babros et al. | Jan. 22, 1957 |
| 2,864,335 | Yellin | Dec. 16, 1958 |